United States Patent [19]
Heflinger et al.

[11] Patent Number: 6,147,755
[45] Date of Patent: Nov. 14, 2000

[54] DYNAMIC OPTICAL PHASE STATE DETECTOR

[75] Inventors: Donald G. Heflinger; Lee O. Heflinger, both of Torrance, Calif.

[73] Assignee: TRW Inc., Redondo Beach, Calif.

[21] Appl. No.: 09/282,946

[22] Filed: Apr. 1, 1999

[51] Int. Cl.[7] .................................................. G01B 9/02
[52] U.S. Cl. .......................................... 356/349; 356/351
[58] Field of Search .................................. 356/345, 349, 356/351

[56] References Cited

U.S. PATENT DOCUMENTS

| 4,466,738 | 8/1984 | Huang et al. | 356/349 |
| 5,493,395 | 2/1996 | Otsuka | 356/349 |

OTHER PUBLICATIONS

Dr. Robert E. Brooks, "Surface Acoustic Wave Signal Processing", Mar. 31, 1984, pp. 3–437 –3–442.

*Primary Examiner*—Robert H. Kim
*Attorney, Agent, or Firm*—Michael S. Yatsko; Robert W. Keller

[57] ABSTRACT

A dynamic instrument measures the state of optical phase of light and provides an output signal having a magnitude that varies linearly relative to the state of optical phase of a first light beam. It comprises means for generating an optical signal, means for generating a radio frequency (RF) signal that is responsive to the optical signal and the RF signal and provides a first light beam and a second light beam, at least one of which is shifted in frequency by an amount corresponding to the RF, an optical interferometer that allows the state of optical phase of the first beam to be changed and that interferometrically combines and heterodynes the changed first light beam and the second light beam, means responsive to the heterodyne signal and operative to produce an electrical signal at the optical beat frequency corresponding to the RF, and means responsive to the RF signal and the electrical signal for providing the linear output signal.

39 Claims, 2 Drawing Sheets

DYNAMIC OPTICAL PHASE STATE DETECTOR

CROSS-REFERENCE TO RELATED APPLICATIONS

This application is related to the following commonly assigned applications: "Heterodyne Wavefront Sensor", TRW Docket No. 11-0972, having inventors Stephen Brosnan, Donald Heflinger and Lee Heflinger; "A Dynamic Optical Micrometer", TRW Docket No. 11-0973, having inventors Donald Heflinger and Lee Heflinger; "Optical Communication System With Phase Modulation", TRW Docket No. 11-1048, having inventors Donald Heflinger and Lee Heflinger; "Improved High Average Power Fiber Laser System With High-Speed, Parallel Wavefront Sensor", TRW Docket No. 11-1049, having inventors Stephen Brosnan, Donald Heflinger, and Lee Heflinger; "Linear Analog Optical Communication System With Two Transmitted Beams And Phase Modulation", TRW Docket No. 11-1050, having inventors Donald Heflinger and Lee Heflinger; and "Optical Communication System With A Single Polarized, Phase Modulated Transmitted Beam", TRW Docket No. 11-1051, having inventors Donald Heflinger and Lee Heflinger; filed concurrently with this patent application.

BACKGROUND OF THE INVENTION

1. Field of the Invention

The present invention is generally related to optical phase detectors, and more particularly to a dynamic optical phase detection instrument that linearly detects the state of optical phase over a set of optical phase states spanning several optical wavelengths.

2. Description of the Prior Art

Present optical phase state detectors are limited in the degree of change in the optical phase state and the upper dynamic response that they can follow. Small fast changes in the optical phase are typically detected using conventional optical interferometry. In such conventional optical interferometry, the light of which the phase state is to be detected is optically interfered with a reference light beam at the same wavelength. The resulting state of interference indicates the relative optical phase state of the light and is detected by measuring the optical intensity of the interference. The resulting interference pattern creates a change in optical intensity that varies sinusoidally as a function of the relative state of phase of the light in the two interfering beams. The magnitude of the varying intensity is correlated to a particular state of optical phase of the light to be detected. However, this conventional approach only allows for the detection of an optical phase change associated with the variation of a single wavelength of the light to be detected. Further optical phase change repeats the described intensity variation and creates ambiguous results.

What is needed, therefore, is an apparatus and a method for dynamically detecting the state of optical phase of an object that spans several wavelengths of light.

In addition, it is desirable to produce an indication that is linearly related to the state of optical phase of the object.

SUMMARY OF THE INVENTION

The preceding and other shortcomings of the prior art are addressed and overcome by the present invention which provides generally a dynamic optical phase detection instrument.

Briefly, the optical phase detection instrument detects the state of optical phase spanning several wavelengths of light with a fast dynamic response. The approach utilizes optical interference in combination with an optical frequency shift using radio frequency (RF) modulation techniques and simple digital processing to simultaneously achieve a detection range spanning many wavelengths, an output voltage that is linearly related to the state of optical phase, and a rapid response to changes in optical phase. The invention employs an optical frequency shifter, such as an acousto-optic modulator, that up shifts or down shifts a portion of a beam of transmitted light to a new optical frequency by an amount corresponding to an RF modulation frequency. The transmitted light beam and the shifted light beam are then directed through an interferometer where one of the two beams is applied to a photonic component that effects the state of the optical phase of the light by changing the optical path length of a leg of the interferometer. The RF shifted light beam and the unshifted light beam, one of which has had its phase shifted by the photonic component, are then interferometrically combined. A detector delivers an electrical signal generated by the optical heterodyne of the two optical frequencies to create the optical beat frequency that corresponds to the frequency of the RF modulation. The phase of the detected RF beat frequency relative to the original RF modulation signal contains the phase information created by the photonic component. The detection of the relative phase of the RF signals is performed by a digital dividing technique that provides a high resolution determination over several optical wavelengths. More particularly, both the RF beat frequency signal and the RF modulation signal are converted to digital waveforms that are digitally divided by an equal number of powers of two so that the resulting outputs are square waves. The divided signals are applied to an exclusive OR gate that provides a pulse waveform having a duty cycle that reflects the relative phase state of the two RF frequencies. The pulse waveform is filtered to create an average voltage that linearly corresponds to the particular state of phase.

The foregoing and additional features and advantages of this invention will become apparent from the detailed description and accompanying drawing figures below. In the figures and the written description, numerals indicate the various elements of the invention, like numerals referring to like elements throughout both the drawing figures and the written description.

DETAILED DESCRIPTION OF THE PREFERRED EMBODIMENTS

Figure 1:
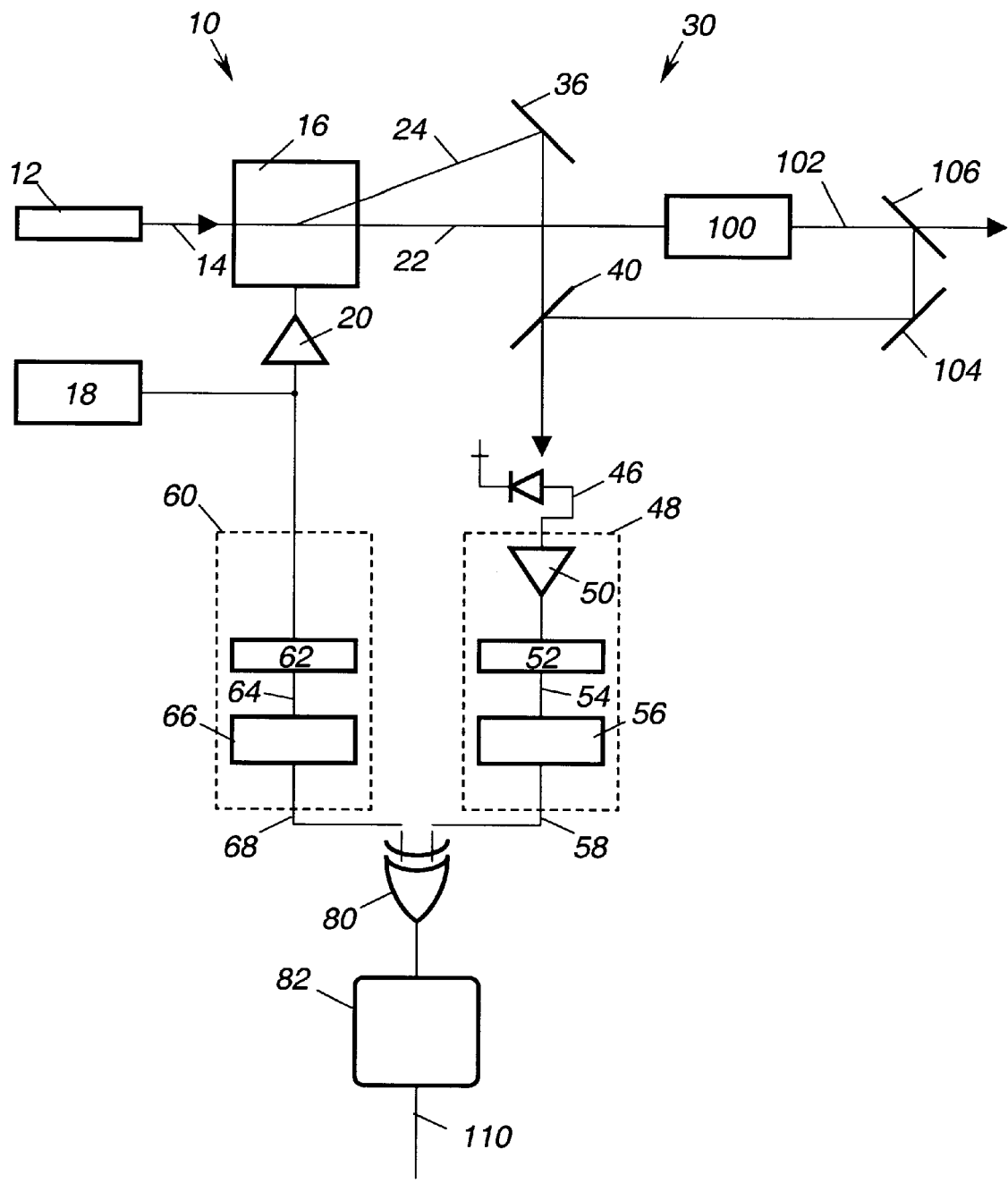
FIG. 1 is a schematic block diagram of the optical instrument in accordance with the present invention.

As illustrated in the schematic block diagram of FIG. 1, the present invention provides a dynamic optical instrument, generally designated by the numeral 10. As will be described the optical instrument 10 generates a linear voltage signal corresponding to the dynamic state of the optical phase of light, also referred to as a particular wavefront state. In this way, this invention provides for a wavefront sensor that generates a linear voltage signal corresponding to a particular wavefront state.

An optical source 12 generates a beam of coherent light or an optical signal at frequency v, which is applied on an optical fiber or a free-space beam 14 to an optical frequency shifter 16. Preferably, the optical source 12 is a helium neon (HeNe) laser that generates a beam of light with a wavelength of 0.63 micrometers, although any coherent source such as a laser diode can also be used. A radio frequency (RF) oscillator 18 generates an RF fixed frequency electrical signal which is applied through an amplifier or RF driver 20 to the optical frequency shifter 16. Preferably the RF signal is a sinusoidal signal at 40 MHz, but any RF frequency may be utilized that is higher than the highest frequencies of optical phase change. The optical frequency shifter 16 serves to shift the optical frequency of the light sent into the instrument by an amount corresponding to the RF. In the preferred embodiment, the optical frequency shifter 16 is an acousto-optic modulator. Alternatively, it can be an optical modulator such as a Mach-Zehnder modulator followed by a narrow pass band optical filter to extract the shifted side band light.

The acousto-optic modulator generates an acoustic sound wave in an optically transparent medium by use of a piezoelectric transducer and the applied RF. This sound wave provides a traveling Bragg grating with a period that corresponds to the RF and diffracts the incident light into an up shifted and/or down shifted light beam. The first order of diffraction is shifted in optical frequency by the RF, the second order of diffraction is shifted in optical frequency by twice the RF and so on. In the preferred embodiment the acousto-optic modulator 16 creates an acoustic sound wave that forms a traveling Bragg grating and generates two optical beams 22 and 24 from the modulated beam of light. The optical beam 22 comprises the unshifted zeroth order beam of transmitted coherent light at frequency v that passes directly through the modulator 16 and the optical beam 24 is a first order Bragg diffracted beam that is up shifted in optical frequency by the RF modulation frequency (v+40 MHz) and is directed at the Bragg diffraction angle. Alternatively, both beams can be shifted. In any event, the beam 24 is separated from the beam 22.

An optical interferometer generally designated by the numeral 30, sends the unshifted beam 22 incident onto a photonic component 100 having an output 102. The photonic component 100 is an optical device that effects the state of the optical phase of the light as it is delivered at its output 102 relative to the state of phase that would be present at this point if the photonic component were absent. It does this by changing the "optical path length".

In this patent the phrase "optical path length" is characterized and mathematically defined as the product of the physical propagation distance and the associated refractive index of the medium through which the light propagates. It should be recognized that adjusting the optical path length can be accomplished by adjusting the physical propagation distance or adjusting the index of refraction of the medium through which the light propagates in the interferometer. In some photonic components the physical propagation distance can be adjusted by stretching a fiber with a piezoelectric transducer, thermally expanding the length with heat, or positioning a mirror within the interferometer via a piezoelectric piston. Adjusting the index of refraction could be accomplished by heating the medium or by an electro optic affect created via an applied electric field.

An example of a photonic component is a straight phase modulator. In the straight phase modulator, the light enters an electro-optic medium that has a refractive index that depends linearly on a voltage applied across the medium. Thus, the refractive index of the optical medium can be dynamically changed according to the applied voltage signal. When the refractive index of the optical medium is changed, the "optical path length" is changed. This causes a change in the relative optical phase of the light delivered by the instrument. Relative means the state of the phase at the output when the photonic component is active compared to the state of the phase at the output when the photonic component is inactive, or also means the phase under one condition, e.g. an applied voltage, relative to a standard condition, e.g. no applied voltage.

Another such "photonic component" is a moving mirror or object. In this case, the "optical path length" is changed by increasing or decreasing the propagation distance (not the refractive index), but the same change in the state of the optical phase results.

A third example of a "photonic component" is a high power doped fiber amplifier. This high power doped fiber amplifier will thermally heat up and cause uncontrollable changes in the "optical path length" (through both refractive index changes and thermal expansion of the propagation path) that will cause the state of the optical phase at its output to uncontrollably change. In fact, any medium that changes the optical path length can be a photonic component, including changes in the atmosphere.

For all examples of a photonic component, this invention will provide a voltage that is linearly related to the state of optical phase delivered by the photonic component. Depending on the photonic component of interest this voltage can be used to recover an analog communication signal originally imported to a straight phase modulator, determine the position of a moving mirror or object, or provide a correction signal to allow the optical state of phase delivered by a high power doped fiber amplified to be controlled.

To detect the optical phase state of the light delivered by the photonic component 100, a portion of the phase shifted output signal 102 is extracted and fed back to the beam splitter 40 through reflector 104, which preferably is an approximately 45° mirror. The remainder of the phase shifted output signal is available and can be utilized for various optical applications, such as, for example, in the case of the high power doped fiber amplifier a target illuminating beam with an optical phase state that is controlled via the correction signal voltage provided by this invention.

The up shifted beam 24 is routed through a reflector in the form of an approximately 45° angled mirror 36 in the interferometer 30 to the beam splitter 40, preferably a 50—50 beam splitter that provides equal reflectivity to each beam. The beam splitter 40 combines the light from the frequency upshifted and frequency unshifted but phase shifted beams so that the optical interference between the beams performs a heterodyne of these two optical frequencies at v and v+40 MHz which generates the beat frequency representative of the RF modulation frequency and having a phase that corresponds to the state of optical phase created by the photonic component 100. Preferably, the optical path length of the two beams are equal. The beam splitter achieves this optical interference and performs the heterodyne by making the two beams co-linear and superimposed on each other, but other techniques, including fiber optic combining techniques, also can be used.

It should be recognized that the degree of coherence provided by the particular source used dictates the optical path lengths and the particular beam recombination geometry. Thus sources at various wavelengths, optical paths of different lengths and different mirror geometries may be employed. It is important, however, that the light from the two beams be combined so that the optical interference that occurs between the two beams generates the beat frequency corresponding to the RF modulation frequency.

In addition, the acousto-optic modulator 16 can generate other beams that can be used besides the unshifted beam 22 and the upshifted beam 24 shown in FIG. 1. In particular, it can generate a down-shifted beam (not shown) that can be used in place of the upshifted beam. It is also possible to direct the shifted beam (either up or down) onto the photonic component and use the unshifted beam as a reference thereby inverting their use. Moreover, the upshifted beam can be used as the beam directed onto the photonic component 100 and the down-shifted beam as a reference or vise versa. In this case, the signal from the RF generator 18 will need to be doubled before it is used to electronically process the phase state as will be described. Furthermore, higher order Bragg diffracted beams beyond the first order can be used. Usage of the higher order Bragg diffracted beams will also require appropriate changes to the frequency that is supplied by the RF generator 18. These variants sometimes have practical importance but for this description it will be assumed for convenience that the unshifted beam 22 is directed onto the photonic component and the upshifted beam 24 is used as the reference for the interference.

A photodetector 46 responds to the intensity variations in interference of the combined beams and by optically heterodyning the two optical frequencies to create the RF beat frequency signal. In the preferred embodiment, this photodetector is a PIN photodiode; however, other types of photodetectors such as avalanche photodiodes or photomultiplier tubes can be used. This is applied to path 48 as shown in dashed lines. The phase of the detected RF beat frequency relative to the original RF driver signal from RF generator 18 corresponds directly to the particular state of phase generated by the photonic component. An amplifier 50 amplifies the detected RF beat frequency signal to a sinusoid at a preselected amplitude that can trigger a digitizing circuit. More particularly, a Schmidt trigger 52 converts the sinusoid into a digital waveform signal at 54 which corresponds to the RF beat frequency. However, other components that are functionally equivalent to a Schmidt trigger and that yield a signal that can be sent to a digital divider also can be used.

The signal at 54 is then provided to a digital divider 56 that creates at its output 58 a square wave that is lower in frequency by the particular integer divisor used in the divide chain. Simple digital flip-flop dividers make it convenient to divide by a particular power of two. Mathematically, the square wave frequency is:

$$f/2^m, \text{ where } m=1,2,3,4\ldots$$

and f is the RF modulation frequency. The power of two used for the division depends on the desired resolution of the phase is to be studied. It will be apparent that division by integers, denoted by N, other than powers of two also will result in similar performance provided the output of the divider chain is a square wave and that both chains 48 and 60 divide identically. Division by powers of two is the preferred embodiment because of its simplicity and ease of implementation.

Similarly, a portion of the RF modulating signal developed by the RF oscillator 18 is applied as a reference signal to a path 60 shown in dashed lines, and more particularly to the input of a Schmidt trigger 62 that serves to convert the sinusoid and develop a digital waveform at the RF modulating frequency at its output 64. Digital divider 66 creates on its output 68 a square wave that is lower in frequency by the same power of two used in digital divider 56. In the preferred embodiment, digital dividers 56 and 66 are FAST TTL flip-flops manufactured by Fairchild Corporation and designated as Model 74F74. The two resulting square waves on outputs 58 and 68 have an offset in their relative phase dependent on the original offset in phase that was created by the photonic component 100.

Figure 2:
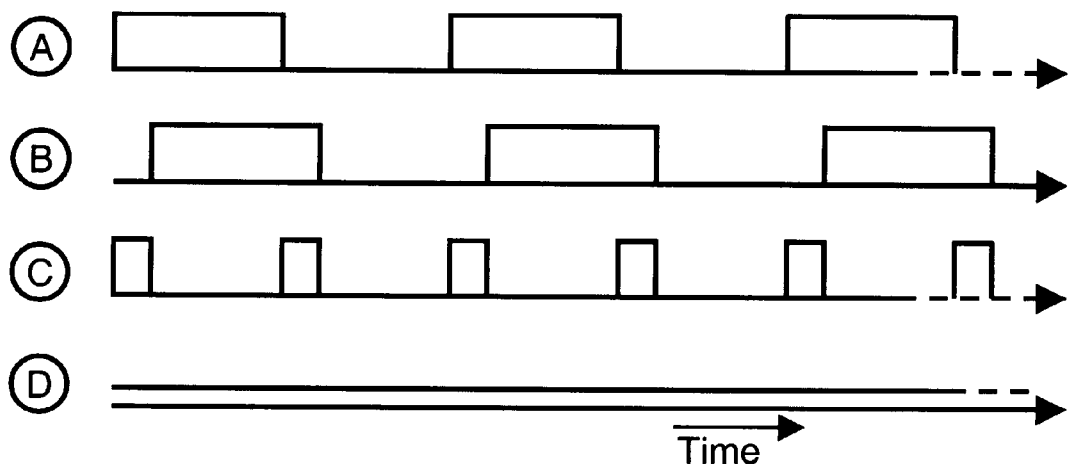
FIG. 2 is a timing diagram illustrating the waveforms developed at several elements in the optical instrument illustrated in FIG. 1.

With reference now to FIG. 2 timing diagrams are shown for the signals appearing at the outputs 68 and 58 as they are processed through successive stages of the optical instrument. More particularly, the offset is shown by the displacement in the transitions in the timing diagram between the signal at output 68 at FIG. 2A, which is the divided signal applied by the RF oscillator, and the signal at output 58 at FIG. 2B, which is the divided square wave signal from the optically detected RF beat frequency. As illustrated one period of the square waves shown in FIGS. 2A and 2B is $2^m/f$. When these square wave signals are combined by an exclusive OR gate 80 it produces a pulse waveform shown by the signal at FIG. 2C. The pulse waveform has a duty cycle dependent on the changed phase due to photonic component 100. This duty cycle is then sent through a low pass filter 82 that develops a DC voltage on its output 110 as shown in FIG. 2D, having a magnitude that is dependent on the duty cycle. Preferably, the low pass filter 82 is a conventional resistor capacitor integrator circuit and has a passband that is less than 1 MHz.

Figure 3:
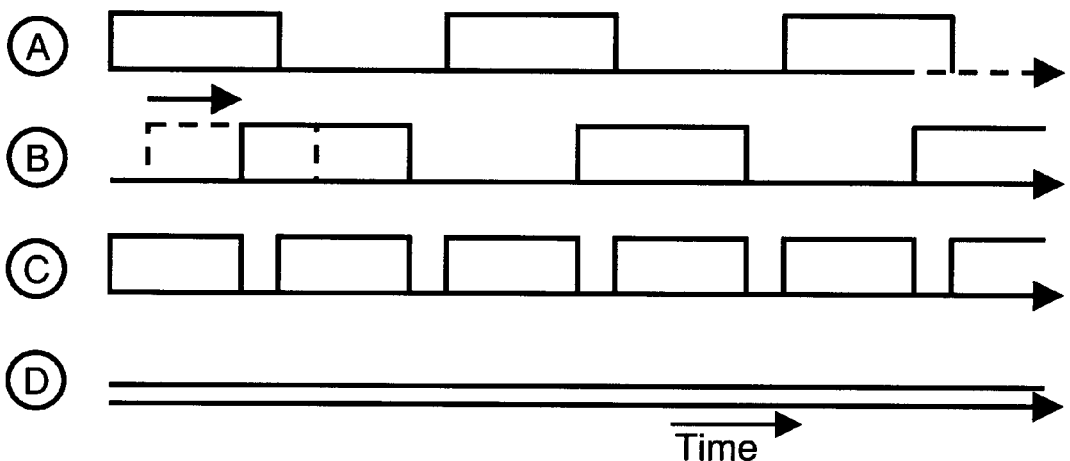
FIG. 3 is a timing diagram illustrating the waveforms developed at several elements in the optical instrument after the state of phase has been changed.
Figure 4:
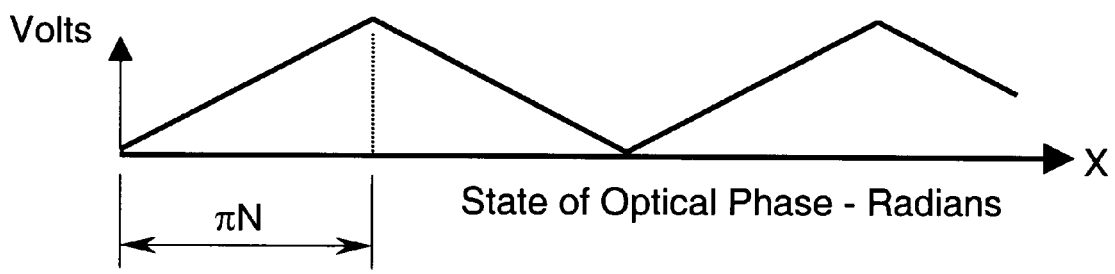
FIG. 4 is a plot of voltage versus state of optical phase representing the output signal produced by the detected state of phase change.

As shown in FIG. 3, when the photonic component 100 changes the relative optical state of phase of optical output 102, a new interference pattern is developed by the optical interferometer. This results in the square wave signal at FIG. 3B being developed by the digital divider 56. As shown, the square wave signal at FIG. 3B is displaced relative to the signal at FIG. 3A (and also to the signal shown in FIG. 2B as illustrated by the dashed lines) and corresponds to the new change in the optical phase state. This leads to a new pulse waveform at the output of the exclusive OR gate 80 with an increased duty cycle as shown by the signal at FIG. 3C. This increased duty cycle creates a larger DC voltage at the output 110 of the low pass filter 82 as shown in FIG. 3D. This has a linear dependence on the actual phase change. For example, if the phase change caused by photonic component 100 is made to arbitrarily move back and forth, its resulting waveform of voltage versus the state of optical phase follows a repeating linear triangular waveform that spans several wavelengths as shown in FIG. 4. Note that in FIG. 4 the independent variable is the state of optical phase in radians (not time as shown in FIGS. 2 and 3), and that voltage increases linearly from a minimum to a maximum when the state of optical phase is changed by $\pi N$ radians. For the special case of division by power of two, this is also equal to $\pi 2^m$ radians, where m is the integer power of two used in the divider chains 66 and 56. In normal use the division ratio will be chosen so that the detected multiple wavelengths of phase change all takes place on a single slope or segment of the response curve of FIG. 4, thus giving a linear response without passing over the peaks or valleys of the triangle wave, thereby avoiding ambiguity. Thus, the change in state of phase can be directly read from the magnitude of the DC voltage.

There is a "time constant" associated with this low pass filter 82 that is significant in determining how fast a phase transition the invention can accurately follow. If the phase changes faster than the time this integrator or filter needs to convert the pulse waveform to a DC voltage (characterized by its "time constant"), then the voltage at that time will not accurately reflect the actual state of the optical phase. The integrator time constant can be made shorter, and hence the instrument's response will become faster. For the application to a moving object, the time constant used must be within the dynamic response of the motion measured. This will also be true for correction of the high power doped fiber amplifier; however, these changes will be relatively slow and easily achieved.

The dynamic optical instrument is not constrained to using any particular wavelength of light or any particular RF modulation frequency. However, to achieve high resolution measurements of the phase change, the RF modulation frequency should be chosen to be high enough so as to ensure that the divided down square wave frequency used for the phase comparison is still much greater than the dynamic phase response of interest. It should also be noted that the present invention provides a linear voltage signal that represents the optical state of phase of the light as it is delivered from the photonic component. Use of the invention in this application would allow phase changes delivered by a photonic component from both controlled and uncontrolled conditions, such as those induced by temperature, to be actively tracked by the output voltage signal delivered at 110.

Obviously, many modifications and variations of the present invention are possible in view of the above teachings. Thus, it is to be understood that, within the scope of the appended claims, the invention may be practiced otherwise than as specifically described above.

What is claimed is:

1. An optical instrument for measuring the state of optical phase of light comprising:

optical frequency shifting means responsive to an optical signal and a radio frequency (RF) signal and operative to provide a first light beam, and a second light beam, at least one of which is shifted in frequency by an amount corresponding to the RF;

optical interferometer means responsive to said first and said second light beams and operative to change the state of optical phase of the first beam and interferometrically combine it with said second light beam to form a heterodyne signal;

means responsive to said heterodyne signal and operative to produce an electrical signal at the optical beat frequency corresponding to the RF; and means responsive to said RF signal and said electrical signal and operative to provide an output signal that has a linear correspondence to the state of optical phase of the first light beam.

2. The optical instrument as set forth in claim 1, wherein said output signal has a magnitude that varies linearly relative to the state of optical phase of the first light beam.

3. The optical instrument as set forth in claim 1, and further comprising means for generating said optical signal.

4. The optical instrument as set forth in claim 1, and further comprising means for generating said RF signal.

5. The optical instrument as set forth in claim 1, and further comprising a photonic component coupled to said optical signal and providing an output signal that is shifted in phase therefrom.

6. The optical instrument as set forth in claim 1, wherein said means responsive to said RF signal and said electrical signal includes first means for converting said RF signal into a first digital waveform, a first digital divider for dividing said first digital waveform by a predetermined integer to form a first square wave, second means for converting said electrical signal into a digital waveform, a second digital divider for dividing said second digital waveform by said same predetermined integer to form a second square wave, an exclusive OR circuit for processing said first and said second divided square waves, and means for integrating said processed square waves to provide said output signal having a magnitude that varies linearly relative to the state of optical phase of said first light beam.

7. The optical instrument as set forth in claim 6, wherein said output signal magnitude varies linearly from a minimum to a maximum when the state of optical phase is changed by $\pi 2^m$ radians, where m is an integer.

8. The optical instrument as set forth in claim 6, wherein said output signal magnitude varies linearly from a minimum to a maximum when the state of optical phase is changed $\pi N$ radians, where N is an integer.

9. The optical instrument as set forth in claim 1, wherein said means responsive to said RF signal and said electrical signal includes a first digital divider and a second digital divider, said digital dividers serving to divide the said first and second digital waveforms by N to form said first and second square waves, where N=1, 2, 3, 4, and circuit means responsive to the divided first and second square waves and operative to produce said output signal.

10. The optical instrument as set forth in claim 1, wherein said means responsive to said RF signal and said electrical signal includes a first digital divider and a second digital divider, said digital dividers serving to divide the said first and second digital waveforms by $2^m$, where m is any integer to form said first and second square waves, and circuit means responsive to the divided first and second square waves and operative to produce said output signal.

11. The optical instrument as set forth in claim 9, wherein said circuit means includes an exclusive OR circuit for providing a pulse waveform having a duty cycle that reflects the relative phase between the first divided square wave and the second divided square wave and an integrating circuit for developing said output signal.

12. The optical instrument as set forth in claim 11, wherein said output signal has a magnitude that varies linearly relative to the state of optical phase of said first light beam.

13. The optical instrument as set forth in claim 11, wherein said output signal has an increasing magnitude over the change in the state of the optical phase equal to the product of $\pi$ radians of phase change and the divisor of the said digital dividers.

14. The optical instrument as set forth in claim 11, wherein said output signal magnitude varies linearly from a minimum to a maximum when the state of optical phase is changed by $\pi 2^m$ radians, where m is an integer.

15. The optical instrument as set forth in claim 11, wherein said output signal magnitude varies linearly from a minimum to a maximum when the state of optical phase is changed $\pi N$ radians, where N is an integer.

16. The optical instrument as set forth in claim 11, wherein the state of optical phase of light is due to a photonic component that causes a change to the optical path length.

17. The optical instrument in claim 1, wherein said optical frequency shifting means is an acousto-optic modulator.

18. The optical instrument in claim 1, wherein said optical frequency shifting means includes a Mach-Zehnder modulator and a narrow pass band optical filter.

19. The optical instrument in claim 1, wherein said first light beam and said second light beam are shifted in frequency.

20. The optical instrument in claim 1, wherein at least one of said light beams is shifted in frequency by a multiple of said RF.

21. The optical instrument as set forth in claim 1, wherein said means for generating an optical signal is a helium neon laser.

22. The optical instrument as set forth in claim 1, wherein said means for generating an optical signal is a diode laser.

23. The optical instrument as set forth in claim 1, wherein said means responsive to said RF signal includes means for generating a pulse waveform having a duty cycle that reflects the relative optical phase state of the changed first light beam.

24. The optical instrument as set forth in claim 23, and further comprising means for filtering said pulse waveform to produce said output signal.

25. A method for measuring the state of optical phase comprising the steps of:

modulating an optical signal with a radio frequency (RF) signal so as to generate a first light beam and a second light beam, at least one of which is shifted in frequency by an amount corresponding to the RF;

changing the state of optical phase of the first light beam using a photonic component;

interferometrically combining the phase changed beam and the second light beam so as to produce a heterodyne optical signal at the RF beat frequency having a phase corresponding to the state of the optical phase of the phase changed light beam;

converting the heterodyne optical signal into an electrical signal at the optical beat frequency and having a phase corresponding to the state of optical phase of the phase changed light beam;

dividing the frequency of the RF signal and the electrical signal and generating a pulse waveform from the divided RF signal and the divided electrical signal, the pulse waveform having a duty cycle that reflects the relative phase state of the divided signals; and filtering the pulse waveform to produce an output signal having a linear correspondence to the state of optical phase of the phase changed light beam.

26. The optical instrument as set forth in claim 25, wherein the frequency of the RF signal and of the electrical signal are divided equally.

27. The method for measuring the state of optical phase as set forth in claim 25, wherein the output signal varies linearly with the state of optical phase of the first light beam.

28. The method for measuring the state of optical phase as set forth in claim 25, wherein said first light beam and said second light beam are shifted in frequency.

29. The method for measuring the state of optical phase as set forth in claim 25, wherein said at least one light beam is shifted in frequency by an amount that is a multiple of said RF.

30. The method for measuring the state of optical phase as set forth in claim 25, wherein the step of dividing the frequency comprises the steps of dividing the frequency of the RF signal by N, and dividing the frequency of the electrical signal by the same N, where N is an integer.

31. The method for measuring the state of optical phase as set forth in claim 25, wherein the step of changing the state includes reflecting the first light beam off said photonic element.

32. The method for measuring the state of optical phase as set forth in claim 25, wherein the step of dividing the frequency comprises the steps of dividing the frequency of the RF signal by $2^m$, and dividing the frequency of the electrical signal by the same $2^m$ where m is an integer.

33. The method for measuring the state of optical phase as set forth in claim 25, wherein the step of generating a pulse waveform comprises exclusive ORing the divided RF signal and the divided electrical signal to produce the pulse waveform.

34. The method for measuring the state of optical phase as set forth in claim 25, wherein the state of optical change is due to a photonic component that causes a change to the optical path length.

35. The method for measuring the state of optical phase as set forth in claim 32, wherein the optical signal has a characteristic wavelength and the output signal increases linearly when the state of optical phase is changed from its initial state of optical phase equal to the product of the divisor of said digital dividers and $\pi$ radians of phase change.

36. The method for measuring the state of optical phase of light as set forth in claim 25, wherein the general optical signal is in the form of coherent light.

37. The method for measuring the state of optical phase of light as set forth in claim 25, and further comprising the step of generating said optical signal.

38. The method for measuring the state of optical phase of light as set forth in claim 25, and further comprising the step of generating said RF signal.

39. The method for measuring the state of optical phase of light as set forth in claim 25, and further comprising the steps of generating said optical signal, and generating said RF signal.

* * * * *